(No Model.)
E. HIATT.
APPARATUS FOR ELEVATING HAY AND OTHER SUBSTANCES.
No. 287,930. Patented Nov. 6, 1883.
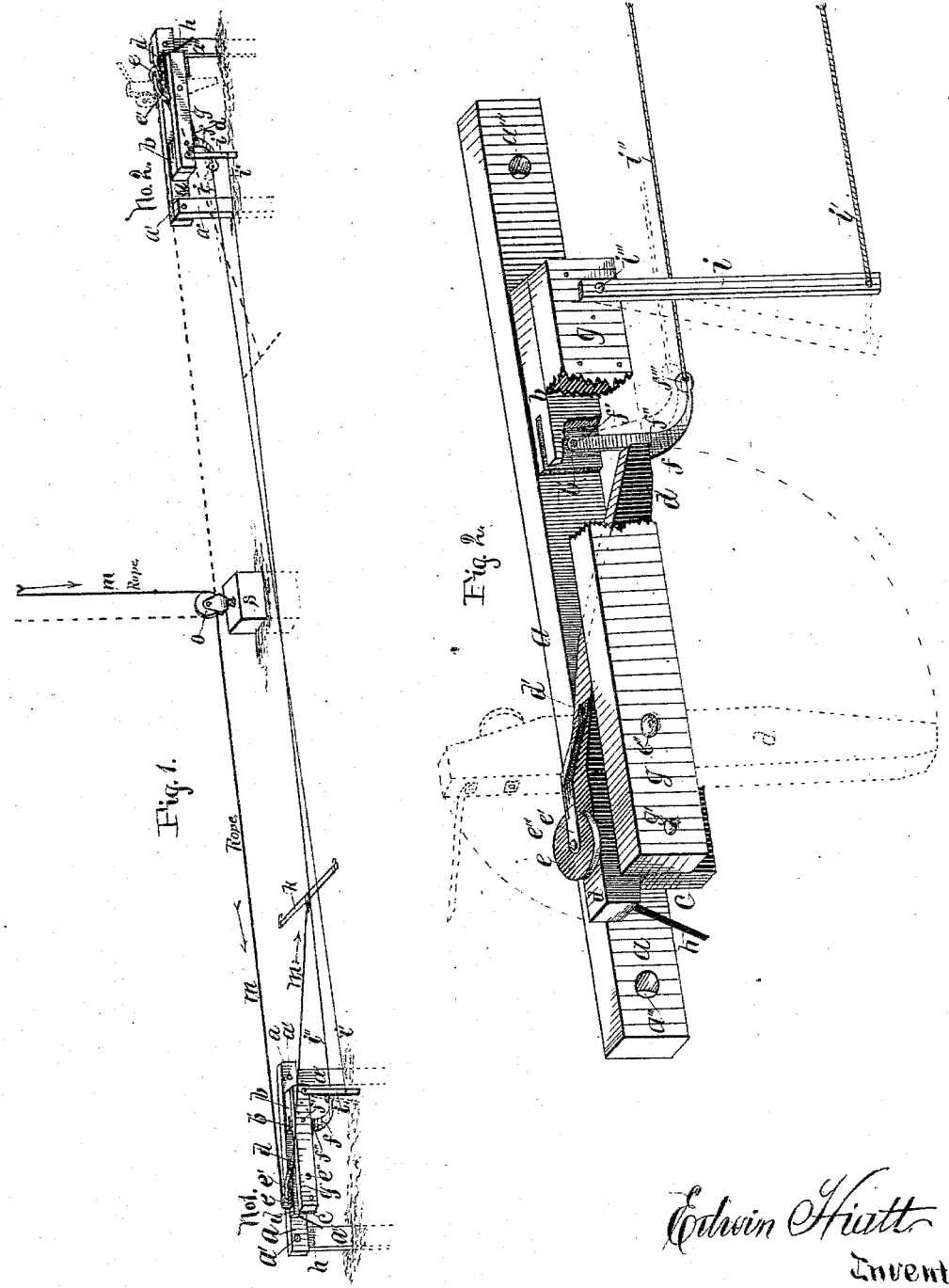

UNITED STATES PATENT OFFICE.

EDWIN HIATT, OF NEW CASTLE, INDIANA.

APPARATUS FOR ELEVATING HAY AND OTHER SUBSTANCES.

SPECIFICATION forming part of Letters Patent No. 287,930, dated November 6, 1883.

Application filed September 24, 1883. (No model.)

*To all whom it may concern:*

Be it known that I, EDWIN HIATT, a citizen of the United States, residing at New Castle, in the county of Henry and State of Indiana, have invented a new, useful, and Improved Apparatus for Elevating Hay and other Substances, of which the following is a specification.

My invention relates to an apparatus for elevating hay and other articles by horse-power; and it may be readily understood after stating that in the usual method employed in elevating hay in barns or raising heavy substances where horse-power is used the horse is attached to a rope, one end of which is secured to the load, passed up over a pulley, and brought down under a pulley at the ground, at which place the horse is attached. In raising a load the horse moves away from the pulley the desired distance, (the distance the weight or load is elevated,) then backed or turned around and brought back to the pulley to perform the same operation again, thus losing one-half time in driving back each time a load is raised.

My invention consists in constructing a trip-pulley mechanism, securing one on each side of the stationary or ground pulley (heretofore described) the desired distance apart, and connecting the said trip-pulleys to each other by two cords, the whole operating in the manner hereinafter set forth.

The objects of my invention are to facilitate the elevation or raising of heavy articles by horse-power, and to increase the capacity of horse-power elevating mechanism. These objects I attain by the mechanism illustrated by the accompanying drawings, in which—

Figure 1 is a perspective view of two trip-pulleys arranged on each side of a stationary pulley, as in use; and Fig. 2 is a detail view of a trip-pulley.

Similar letters refer to similar parts throughout the several views.

A pulley, $o$, is secured to the barn-floor, or to a block, $s$, set in the ground. This pulley is of a common form, and it is secured near by where the hay or other articles are to be elevated, and on each side of this pulley are secured the trip-pulleys No. 1 and No. 2, all as shown in Fig. 1.

The back bar, $a$, is provided with holes $a'''$ in each end, for attaching it to the posts $a''$, or any suitable object. The slotted block $b$ and block $c$ are secured to the said bar $a$, a few inches apart, as shown in Fig. 2. To the outside of the said blocks is secured a bar, $g$, as shown, forming a space in which the trip-block $d$ is pivoted and made to operate, as shown. The said block is secured between the bars $a$ $g$ by a bolt, $e''$, so that it can turn down, as indicated in dotted lines. To the upper part of the block $d$ is secured a pulley, $e$, by the strap $e'$ and bolts $d'$ and $e'''$, and a bar of iron, $h$, is secured to the outer end, to cause the block to stand in a horizontal position. A hook, $f$, is pivoted in the slot $b'$ by the bolt $f'$, as shown in Fig. 2. A shoulder or notch, $f''$, is formed at about the center, and the lower end is curved backward and made heavy, and to which one of the cords $i'$ $i''$ is secured. By the lower end being heavy the lower end of block $d$ will catch and rest on the shoulder $f'''$, as shown in Fig. 2. A lever, $i$, is pivoted to the bar $g$, for securing one end of one of the cords $i'$ $i''$. The cord $i'$ is secured to the lever $i$ on No. 1, and to the hook on No. 2, and the cord $i'$ is secured to the hook on No. 1, and to the lever on No. 2, all as shown in Fig. 1.

When the pulleys are ready to operate, as shown in Fig. 1, the rope $m$ is brought from the pulley $o$ around the pulley $e$ in No. 1 and the horse is attached to the single-tree $k$. The horse moves toward No. 2 and the rope is drawn down, as indicated, raising whatever it is attached to, as heretofore described. When the horse passes No. 2, or after the load has been raised and deposited above, the driver strikes the lever $i$ (on No. 2) with his foot, pulling on the cord $i''$, which is attached to the hook $f$ on No. 1, causing the shoulder $f''$ to move away from the bar $d$, allowing the said bar $d$ to very quickly tilt up, letting the rope off of the pulley $e$, and allowing the upper end of the rope to descend by the slack from No. 1 to the center pulley, $o$. The rope is at once placed over No. 2 pulley $e$, as shown in dotted lines, Fig. 1, and the horse turned around and driven back to No. 1, raising a load, the same as in the first movement, and the same operation is continued, raising a load at each time the horse is moved from one pulley to the other, instead of pulling out from the pulley $o$, and then backing (or going back) to the said pulley, to allow the rope to descend to raise another load. It will therefore be seen that my invention will raise a load at each time the horse is moved either way, thereby enabling the operator to perform double the work of the old method.

My invention may also be applied to driving piles or posts, and various other purposes.

Having thus described my invention, I claim and desire to secure by Letters Patent—

1. The bar $a$, having the parts $b\ c$ and $g$ secured to it, and having a pivoted trip-block, $d$, carrying a pulley, $e$, and weight $h$, all operated by the hook $f$, lever $i$, and cords $i'$ and $i''$, for the purpose set forth.

2. The combination of the trip-block $d$, carrying pulley $e\ e'$, and weight $h$, with the hook $f\ f'\ f''\ f'''$, and tilting mechanism $i\ i'\ i''$.

3. In a trip-pulley, the block $d$, carrying a pulley, $e$, pivoted so as to hang in a horizontal position, in combination with the hook $f$ and cord $i''$, all for the purposes set forth.

4. In a trip-pulley, the back $a$, having the blocks $b\ c$ and bar $g$ secured to it, a trip-block, $d$, carrying pulley $e$, pivoted between the bars $a\ g$, and operated by the hook $f$ and cord $i''$, all for the purpose set forth.

EDWIN HIATT.

Witnesses:
W. H. BEAM,
JESSE NIXON.